United States Patent [19]

Jasso

[11] Patent Number: 4,913,483
[45] Date of Patent: Apr. 3, 1990

[54] AUXILIARY SUN VISOR FOR AUTOMOTIVE VEHICLES

[76] Inventor: Daniel J. Jasso, 29493 Clearview La., Highland, Calif. 92346

[21] Appl. No.: 236,908

[22] Filed: Aug. 25, 1988

[51] Int. Cl.$^4$ .............................................. B60J 3/02
[52] U.S. Cl. .................................. 296/97.6; 296/97.8
[58] Field of Search ...................... 296/97.6, 97.8, 97.9

[56] References Cited

U.S. PATENT DOCUMENTS

| | | | |
|---|---|---|---|
| 2,831,726 | 4/1958 | Ralston | 296/97.6 |
| 3,201,170 | 8/1965 | Weingarten | 296/97.6 |
| 3,304,118 | 2/1967 | Jones | 296/97.6 |
| 4,280,730 | 7/1981 | Turner | 296/97.6 |
| 4,352,519 | 10/1982 | Aro | 296/97.6 |
| 4,580,829 | 4/1986 | Matheapoulos | 296/97.6 |

Primary Examiner—Robert R. Song
Attorney, Agent, or Firm—Boniard I. Brown

[57] ABSTRACT

An auxiliary sun visor for use in automotive vehicles. A support panel is removably attachable to the permanent sun visor to provide a swingable support for the auxiliary visor. An elongated flexible hinge strip joins the auxiliary visor to the support panel, to provide strong cantilever reinforcement for the visor. Additional support is provided by a flexible cable trained between the auxiliary visor and a mounting bracket for the main visor.

26 Claims, 2 Drawing Sheets

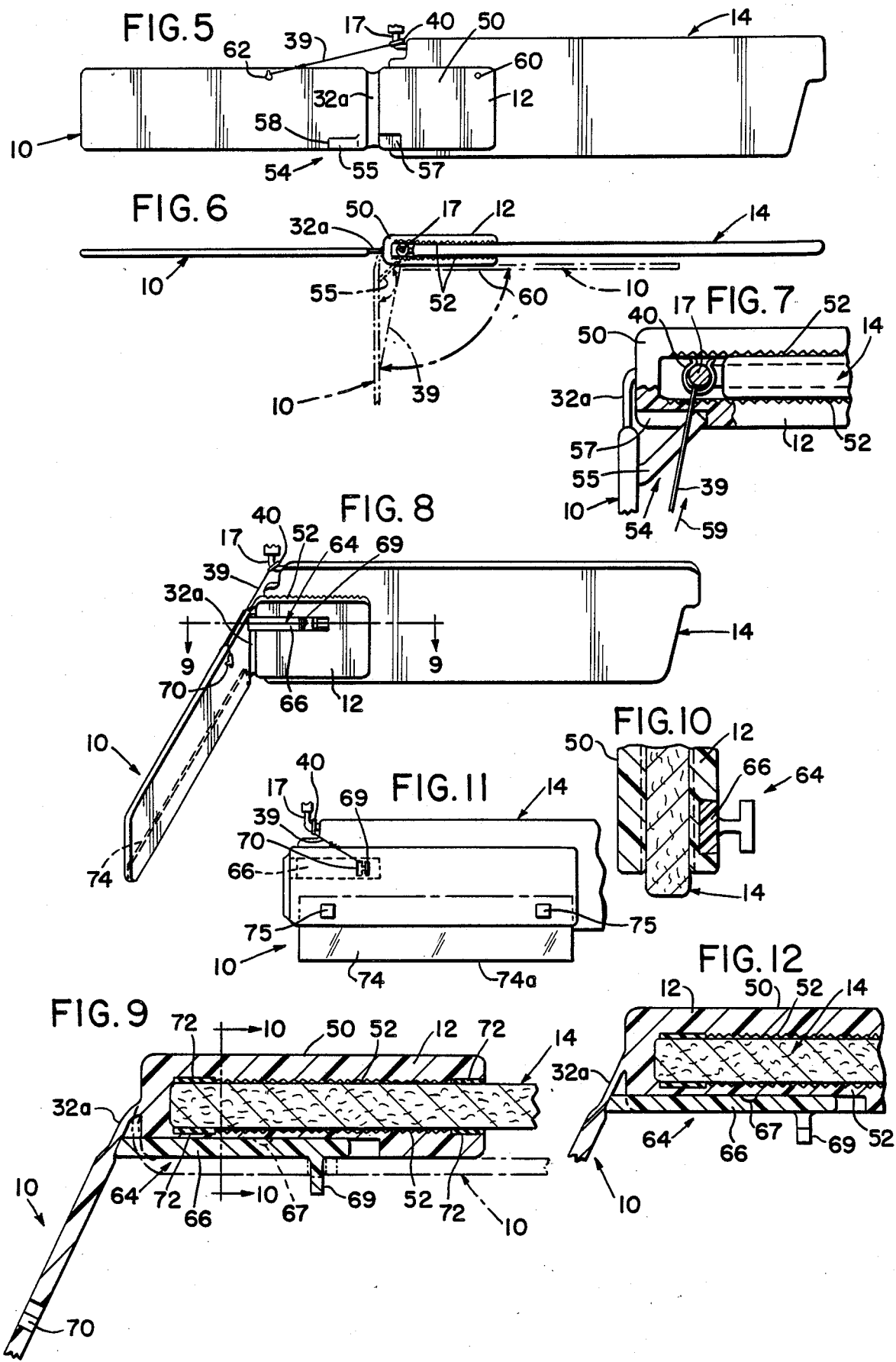

AUXILIARY SUN VISOR FOR AUTOMOTIVE VEHICLES

BACKGROUND OF THE INVENTION

This invention relates to auxiliary sun visors for automotive vehicles, especially auxiliary visors that can be swingably attached to the vehicle's permanent sun visor for movement to a position in near adjacency to the front side window of the vehicle.

Prior to my invention others have proposed auxiliary swingable sun visors. In most cases the auxiliary visors required extensive modifications in the permanent sun visor or in its mounting bracketry. I am proposing an auxiliary sun visor that requires substantially no modification in the pre-existing vehicle hardware (permanent sun visor or its mounting mechanism).

In some respects my invention is similar to add-on visors shown in U.S. Pat. No. 2,485,440 to F. Friedheim, or U.S. Pat. No. 2,823,950 to E. Harris, or U.S. Pat. No. 4,195,876 to H. Timperior, or U.S. Pat. No. 4,580,829 to P. Matheopoulos (FIGS. 1-4 thereof). Each of these patents shows an add-on visor that apparently requires no modifications in the vehicle's main (permanent) visor.

SUMMARY OF THE INVENTION

My proposed sun visor assembly comprises a support panel designed to be removably clamped against the rear face of the vehicle's permanent sun visor. An auxiliary visor element is attached to the support panel via a flexible hinge that is preferably an integral part of the visor-support panel unit. The entire unit can be formed as a one-piece plastic molding.

The flexible hinge has two degrees of motion, such that slight adjustments can be made in the position of the permanent visor without affecting the position of the auxiliary visor. A special cable (or strong string) is trained between the auxiliary visor and visor-mount bracket, whereby the auxiliary visor is prevented from sagging.

The sun visor assembly is preferably formed of a light weight plastic material, with a minimum number of metal components that would undesirably add to the weight of the assembly or produce annoying sounds (e.g. rattling, bearing squeaks, etc.).

THE DRAWINGS

FIG. 5 is a view similar to FIG. 1, but illustrating a second form that the invention can take.

FIG. 6 is a top plan view of the FIG. 5 assembly.

FIG. 7 is a fragmentary enlarged view taken in the same direction as FIG. 6, to illustrate a structural detail.

FIG. 8 is a perspective view of another assembly embodying my invention.

FIG. 9 is a fragmentary sectional view taken on line 9—9 in FIG. 8.

FIG. 10 is a fragmentary sectional view on line 10—10 in FIG. 9.

FIG. 11 is an elevational view of the FIG. 8 assembly, showing an auxiliary sun visor element swung to a storage position against the main visor element.

FIG. 12 is a view taken in the same direction as FIG. 9, but at a slightly different sight plane.

DESCRIPTION OF THE PREFERRED EMBODIMENTS

Figure 1:
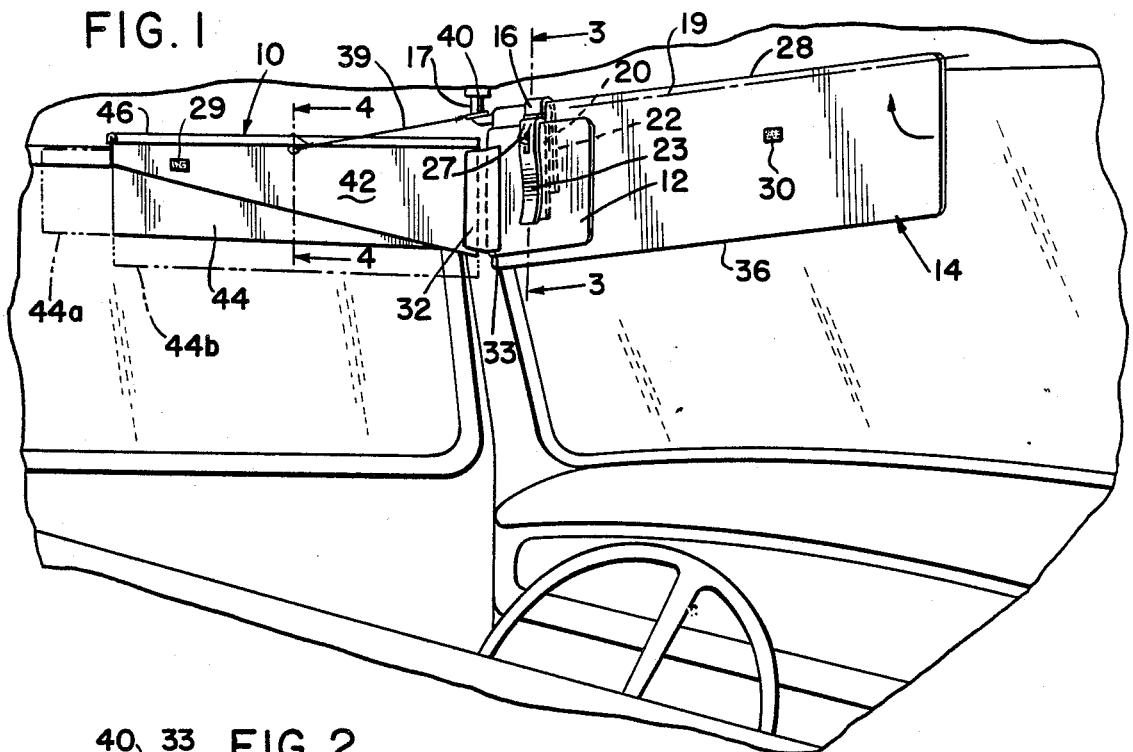
FIG. 1 shows the interior area of an automotive vehicle equipped with an auxiliary sun visor assembly constructed according to my invention.

FIG. 1 illustrates one form of the invention, wherein an auxiliary sun visor 10 is swingably connected to a support panel 12. Panel 12 is removably attached to the rear face of a permanent (main) sun visor 14, via a hook structure 16.

Sun visor 14 is swingably attached to a bracket member 17 that is rigidly affixed to the roof area of the vehicle. Visor 14 can be manually swung around a horizontal axis 19 (extending along its upper edge), to assume a retracted non-use position in near adjacency to the roof area of the vehicle. FIG. 1 shows visor 14 in its "use" position extending vertically between the vehicle windshield and the head area of a person seated in the vehicle.

Visor 14 and bracket 17 are original equipment items employed prior to my invention. My invention relates to the add-on assembly comprised of auxiliary visor 10 and support panel 12.

Support panel 12 is removably attached to the rear face of visor 14 via a hook structure 16 that comprises a flat metal strip 20 extending along the concealed (front) face of the panel 12. A second metal strip 22 is welded to strip 20, as at 26, to form a hook structure that can hook over upper edge 28 of visor 14. Strips 20 and 22 are formed of spring steel, whereby the two strips exert a clamp force on visor 14.

The upper end of strip 20 turns, as at 21, to overlie the upper edge of panel 12; the strip turns downwardly, as at 23, to overlie the exposed (rear) face of panel 12. Strip sections 20 and 23 are constructed of spring steel to exert a clamp force on panel 12. Instead of using a clamp type connection strip 20 could be rivetted to panel 12.

Figure 3:
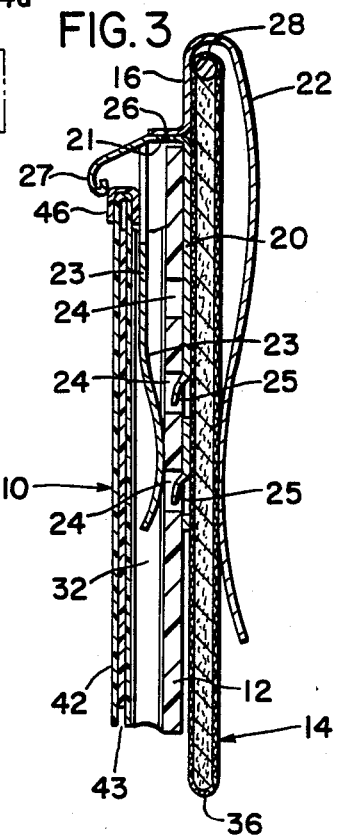
FIG. 3 is a sectional view on line 3—3 in FIG. 1.

The clamp connection shown in FIG. 3 advantageously permits panel 12 to selectively have a raised position on sun visor 14 (as shown) or a lowered position thereon, to thereby enable auxiliary visor 10 to more easily align with the side window areas of a range of different vehicles (e.g. Ford, Chevrolet, Plymouth, etc.).

Panel 12 has three openings 24 adapted to selectively receive therein two prongs 25 that are struck out from strip 20. The two prongs can selectively fit into the two lowermost openings (as shown in FIG. 3) or the two uppermost openings, to vertically adjust the position of panel 12 on visor 14.

FIG. 3 shows auxiliary visor 10 in a stored non-use position swung into near adjacency to support panel 12. A spring tongue 27 is struck out of the strip 23 material to form a detent structure for releasably retaining visor 10 in its non-use position. The visor can be manually pulled away from panel 12 to the "use" position shown in FIG. 1.

Additional mechanisms may be used to releasably retain visor 10 in its non-use position, FIG. 1 shows one such mechanism, comprising a patch of miniature "hook" material 30 glued onto visor 14 and another patch of miniature "loop" material 29 glued onto visor 10. Materials 30 and 29 are commercial items obtainably under the tradename "Velcro". When the two materials come into facial contact they adhere together with sufficient force to maintain visor 14 in its non-use position.

The use of duplicate retention mechanisms (tongue 27 and adherent patches 30, 29) advantageously ensures a rattle-free retention of visor 10 in spite of such adverse factors as slight sag of the visor, slight twist in the visor 10 panel, service wear, manufacturing tolerances, etc.

Auxiliary visor 10 is swingably connected to support panel 12 via a flexible hinge strip 32. Strip 32 may be a strip a fabric (cloth) material adhesively attached to free edge area 33 of support panel 12 and the adjacent edge area of visor 10.

Support panel 12 has a relatively great vertical dimension along the hinge axis; as seen in FIG. 1 panel 12 has a "height" dimension that is only slightly less than the corresponding dimension measured along the surface of visor 14, i.e. from upper edge 28 of the visor to its lower edge 36. This dimensional relationship enables hinge strip 32 to have a relatively long axial length, whereby the strip provides extensive cantilever support for visor 10.

Additional cantilever reinforcement may be provided by a flexible cable or string element 39 trained between the upper edge of visor 10 and pre-existing bracket 17. The free end of flexible element 39 is attached to a resilient clip 40 that is sized to have a releasable snap fit on bracket 17. String element 39 can be formed of a strong flexible material, e.g. monofilament fishline, or an elastic flexible material such as a rubber cord. Element 39 reinforces visor 10 against undesired sag action.

FIG. 1 shows the two visors 14 and 10 in their "use" positions, wherein the visor 14 shields the vehicle occupant from glare through the windshield while visor 10 shields the person from glare through the vehicle side window. FIG. 1 assumes that visor 10 will be in a true vertical position (extending straight down from pivot axis 19). However in practice the person may prefer to adjust visor 14 so that its lower edge 36 is slightly in front of (or in back of) the visor upper edge 28. Such slight adjustments can adversely affect the position of visor 10, so that it tilts down (or up) relative to the upper edge of the vehicle side window.

Flexible cable element 39 counteracts the tendency of visor 10 to tilt when the lower edge of visor 14 is adjusted toward or away from the vehicle windshield. Element 39 keeps visor 10 essentially in the FIG. 1 position in spite of minor adjustments in the position of visor 14. The associated flexible hinge 32 is preferably a relatively wide fabric strip that can buckle slightly without transferring visor 14 motion to visor 10. The fabric strip has two degrees to motion, i.e. a hinging motion in a horizontal plane, and a buckling (wiggling) motion wherein the lower edge of visor 10 can move toward or away from panel 12 (in a relative sense).

Figure 4:
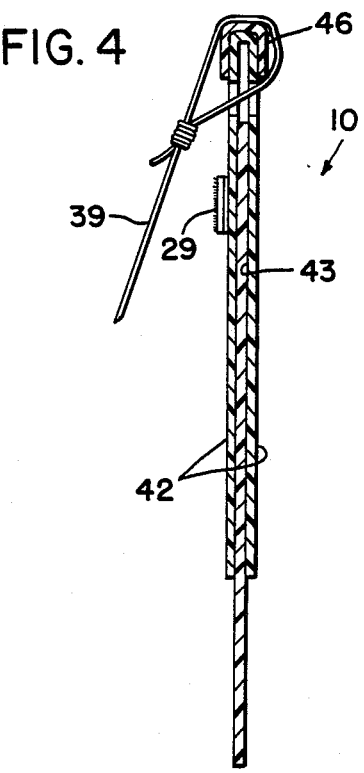
FIG. 4 is a sectional view on line 4—4 in FIG. 1.

Visor 10 can be constructed in various different ways. As shown, the visor includes an elongated plastic sheet 42 formed into a U-shaped configuration (FIG. 4) that defines a narrow slot 43. An add-on plastic sheet 44 may be inserted into slot 43 and held therein by frictional forces. Sheet 44 can be slidably adjusted to extend laterally out from the free end of sheet 42, as at 44a; alternately sheet 44 can be slidably adjusted to a slightly lowered position 44b (FIG. 1). These adjustments somewhat increase the total visor face area, thereby enabling the visor to have a more extensive shielding action. An elongated channel-shaped plastic reinforcement element 46 may be adhesively attached to the upper edge of the visor, if found necessary.

The visor assembly of FIGS. 1 through 4 has several advantages. Of major importance is the fact that the visor assembly can be attached to permanent visor 14 without modifying visor 14 or mounting bracket 17. The auxiliary visor unit can be marketed as an add-on (aftermarket) item.

Another important feature is the flexible resilient hinge structure 32. The hinge structure has a relatively long length in the direction of the hinge axis, such that visor 10 is adequately supported against sag or droop. The hinge structure is well adapted to withstand load forces. The cooperating cable (or string) element 39 maintains visor 10 in a stable position alongside the vehicle side window in spite of slight variations in the position of permanent visor 14.

FIGS. 5 through 7 illustrate a second form that the invention can take. In this case, support panel 12 is part of a U-shaped plastic member 50 adapted to exert a clamp force on opposite face areas of visor 14. The facing internal surfaces on the U-shaped member are serrated, as at 52, to bite into the visor 14 face areas.

The auxiliary visor 10 is a single flat plastic component having an integral hinge connection 32a with plastic member 50. The entire add-on unit, comprised of elements 50, 10 and 32a, may be a one piece molded component, or at least a one piece assembly.

Figure 2:
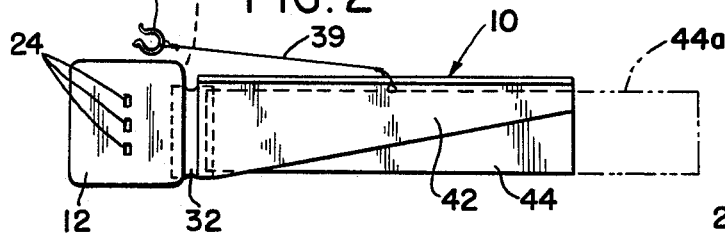
FIG. 2 is an elevational view of a sun visor assembly used in the vehicle of FIG. 1.

In the FIG. 5 unit, hinge connection 32a is flexible to approximately the same extent as fabric hinge 32 shown in FIGS. 1 and 2. The auxiliary visor can be releasably retained in its "use" position (FIG. 7) by a retractable abutment means 54, that comprises a swingable arm 55 extending from visor 10 into a notch 57 in the adjacent face of member 50. Arm 55 is formed by cutting through the visor 10 material, as at 58 (FIG. 5). In service, the defined arm can be manually pulled around its point of attachment on the visor to assume the angularly-extended position shown in FIG. 7.

By making string element 39 out of an elastic material the string element can be made to exert a pulling force on visor 10 in the arrow 59 direction (FIG. 7), whereby visor 10 is retained in its FIG. 7 position. Arm 55 can be manually disengaged from notch 57 to enable visor 10 to be manually swung to a non-use position against the face of panel 12 (dashed lines 10a in FIG. 6). A headed pin 60 can be formed on panel 12 to serve as a retention device for visor 10. As the visor is swung to dashed line position 10a the head on pin 60 enters into an opening 62 in the visor to exert a grip force thereon.

The visor assembly of FIGS. 5 through 7 has many of the advantages enjoyed by the structure of FIGS. 1 through 4. Additionally, the FIG. 5 arrangement has a constructional simplicity, in that U-shaped member 50 acts both as a support for visor 10 and also as a clamp for installation thereof on the permanent visor.

The construction of FIGS. 8 through 12 is essentially the same as the structure of FIG. 5, with minor changes. In the FIG. 8 construction visor 10 is retained in the "use" position by an abutment means 64 that comprises a bar 66 slidably mounted in a dovetail slot in the face of support panel 12. Bar 66 can be slidably extended to engage hinge 32a and thereby retain visor 10 in its "use" position.

A minor bump 67 is formed on the panel 12 surface to engage in a spherical recess in bar 66, to releasably retain the bar in its extended position (FIGS. 9 and 12). In an alternate arrangement (not shown), there can be defined in the bar 66 an elongated recess and spherical detent recesses from the ends of the elongated recess, thus to facilitate movement of the bar relative to bump 67. Manual pressure on knob 69 will retract the bar rightwardly to a non-obstruct position, enabling visor 10 to be swung manually to the dashed line position 10a (FIG. 9). As the visor reaches position 10a, T-slot 70 in the visor fits on to the enlarged outer end of knob 69 to releasably retain the visor in place.

The U-shaped member 50 has serrations on its facing interior surfaces, similar to the previously-described serrations 52. Additionally, four resilient elastomeric pads (strips) 72 are adhesively attached to member 50 for added gripment force on visor 14. The soft resilient surface on each pad 72 enjoys a frictional area-wide contact on the visor 14 surface.

Visor 10 can include a hinged extension flap 74 formed of a thin ferromagnetic sheet. The flap can be swung upwardly against the outer face of visor 10, as shown in FIG. 8; thin ceramic magnets 75 glued onto visor 10 will hold the flap against the visor 10 surface. Alternately, flap 74 can be swung down to the full position 74a in FIG. 11 to effectively increase the visor shield area.

In essential respects the structure of FIGS. 8 through 12 is similar to the structure of FIGS. 5 through 7. The drawings illustrate some variants that can be used in practice of the invention. Other variants and modifications are possible within the scope of the appended claims.

The inventor claims:

1. In a vehicle having a sun visor suspended from a bracket structure affixed to the vehicle, the improvement comprising:
   a support panel to be removably attached flatwise to an outward end edge portion of the permanent visor, the support panel having an outer free edge, an auxiliary visor,
   flexible hinge strip means swingably connecting the auxiliary visor to the support panel such that the auxiliary visor has two degrees of motion, said hinge strip means extending a substantial portion of the length of said outer free edge of the support panel, and
   stabilizer means extending between the auxiliary visor and bracket structure to maintain the auxiliary visor in a stable position in spite of minor adjustments in the position of the permanent visor.

2. The improvement of claim 1, wherein the stabilizer means comprises a flexible cable-like mechanism trained between the auxiliary visor and the bracket structure.

3. The improvement of claim 2, wherein said flexible cable-like mechanism is detachably connected to the bracket structure.

4. The improvement of claim 2, wherein said flexible cable-like mechanism is elastic so that it can stretch in the direction of its length.

5. The improvement of claim 1, and further comprising a retractable abutment means extending between the support panel and auxiliary visor to prevent said auxiliary visor from swinging toward the permanent visor.

6. The improvement of claim 5, wherein said abutment means comprises a swingable arm carried on the auxiliary visor for engagement with the support panel.

7. The improvement of claim 5, wherein said abutment means comprises a bar slidably mounted on the support panel for movement toward or away from the auxiliary visor.

8. The improvement of claim 1, wherein the flexible hinge means comprises a fabric strip having edge areas thereof connected to the auxiliary visor and support panel.

9. The improvement of claim 1, and further including an extension flap hingedly mounted on a lower portion of the auxiliary visor and swingable upwardly into retracted position against the auxiliary visor and downwardly into extended position to increase the visor shield area.

10. The improvement according to claim 9, and further including means for retaining the extension flap in said retracted position.

11. In a vehicle having a sun visor support bracket, and a permanent sun visor suspended from said bracket for vertical swinging adjustment around a horizontal axis in near adjacency to an upper edge of the vehicle windshield, said sun visor having an upper edge, a lower edge, and two end edges, the improvement comprising:
   a support panel to be removably attached to an outer end edge portion of the rear face of the permanent sun visor so that an outer free edge of the support panel closely parallels one end edge of the sun visor,
   an auxiliary sun visor having a swingable connection with the free edge of the support panel, whereby the auxiliary visor can be located in near adjacency to a side window of the vehicle,
   said support panel having a dimension along its free edge that is slightly less than the corresponding dimension of the permanent sun visor, whereby said free edge has a significant length dimension,
   the aforementioned swingable connection comprising a strip of flexible material attached to the auxiliary sun visor and support panel,
   said flexible strip extending along substantially the entire length of said free edge of the support panel to provide extensive cantilever support for the auxiliary visor, and
   stabilizer means extending between the auxiliary visor and bracket structure to maintain the auxiliary visor in a stable position in spite of minor adjustments in the position of the permanent visor.

12. The improvement of claim 11, wherein said stabilizer means comprises a flexible string element means trained between the auxiliary visor and said support bracket to prevent the auxiliary visor from sagging when it is in position near the vehicle side window.

13. The improvement of claim 12, wherein said string element means includes a resilient clip having a releasable snap fit on the support bracket.

14. The improvement of claim 12, wherein the string element means is elastic.

15. The improvement of claim 12, and further comprising a retractable abutment means extending between the support panel and the auxiliary visor to prevent said auxiliary visor from swinging toward the support panel when said auxiliary visor is in a position in near adjacency to the vehicle side window.

16. The improvement of claim 15, wherein said abutment means comprises a swingable arm carried on the auxiliary visor for manual extension into a notch in the exposed face of the support panel.

17. The improvement of claim 15, wherein said abutment means comprises a bar slidably mounted on the exposed face of the support panel for movement toward or away from the auxiliary visor.

18. The improvement of claim 11, and further comprising means for readjusting the support panel on the permanent visor, toward or away from the visor's upper edge.

19. The improvement of claim 11, wherein said strip of flexible material has sufficient width that the auxiliary visor can maintain a position near the vehicle side window even when the permanent visor is not exactly in a vertical plane.

20. The improvement of claim 19, wherein the flexible strip is a cloth material.

21. The improvement of claim 11, and further comprising means for removably attaching the support panel to the rear face of the permanent sun visor,
   said attaching means comprising a hook structure extending from the support panel around an edge of the permanent sun visor and onto the front face of the permanent visor.

22. The improvement of claim 21, wherein said support panel and hook structure are component parts of a one-piece plastic member having a U-shaped cross section.

23. The improvement of claim 22, wherein the facing surfaces of the U-shaped plastic member have serrations therein for gripping engagement with face areas of the permanent visor.

24. The improvement of claim 22, and further comprising elastomeric resilient pads carried on the facing surfaces of the U-shaped plastic member for gripping engagement with face areas of the permanent visor.

25. The improvement of claim 21, wherein the attaching means comprises a second hook structure partially encircling the support panel in adjustable fashion, such that the panel can selectively have a raised position or a lowered position on the permanent visor.

26. The improvement of claim 25, and further comprising at least two prongs formed on the second hook structure, and at least three openings formed in the support panel, said prongs being selectively insertable into different ones of the openings to adjust the panel on the second hook structure.

* * * * *